(12) United States Patent
Liang

(10) Patent No.: US 8,503,176 B2
(45) Date of Patent: Aug. 6, 2013

(54) FAN SYSTEM WITH SWITCHING MODULE CONNECTING PWM DEVICE AND FAN

(75) Inventor: Zhi-Chun Liang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 247 days.

(21) Appl. No.: 13/186,720

(22) Filed: Jul. 20, 2011

(65) Prior Publication Data

US 2012/0314368 A1 Dec. 13, 2012

(30) Foreign Application Priority Data

Jun. 9, 2011 (CN) .......................... 2011 1 0153173

(51) Int. Cl.
*H05K 7/20* (2006.01)
*H02P 7/29* (2006.01)

(52) U.S. Cl.
USPC ............ 361/695; 361/690; 361/694; 318/599

(58) Field of Classification Search
None
See application file for complete search history.

(56) References Cited

U.S. PATENT DOCUMENTS

| | | | | |
|---|---|---|---|---|
| 5,506,484 A * | 4/1996 | Munro et al. | ................. | 318/599 |
| 6,396,688 B1 * | 5/2002 | Davies et al. | ............ | 361/679.48 |
| 7,199,542 B1 * | 4/2007 | Chen | ............................ | 318/473 |
| 7,313,466 B2 * | 12/2007 | Chang et al. | ................. | 700/300 |
| 7,786,781 B1 * | 8/2010 | Ng et al. | ....................... | 327/175 |
| 2012/0292063 A1 * | 11/2012 | Forster et al. | ................... | 173/18 |

* cited by examiner

*Primary Examiner* — Boris Chervinsky
(74) *Attorney, Agent, or Firm* — Altis Law Group, Inc.

(57) ABSTRACT

A switching module is for connecting a Pulse Width Modulation (PWM) device to a plurality of fans under test. The switching module includes a print circuit board (PCB), and a plurality of groups of signal connectors arranged on the PCB. Each group of signal connectors includes a first port, a second port, and a third port interconnected with each other. The first port is for connecting to a testing port of an external PWM device. The second port is for connecting one corresponding fan of the plurality of fans. The third port is for connecting an interface of a server motherboard.

7 Claims, 1 Drawing Sheet

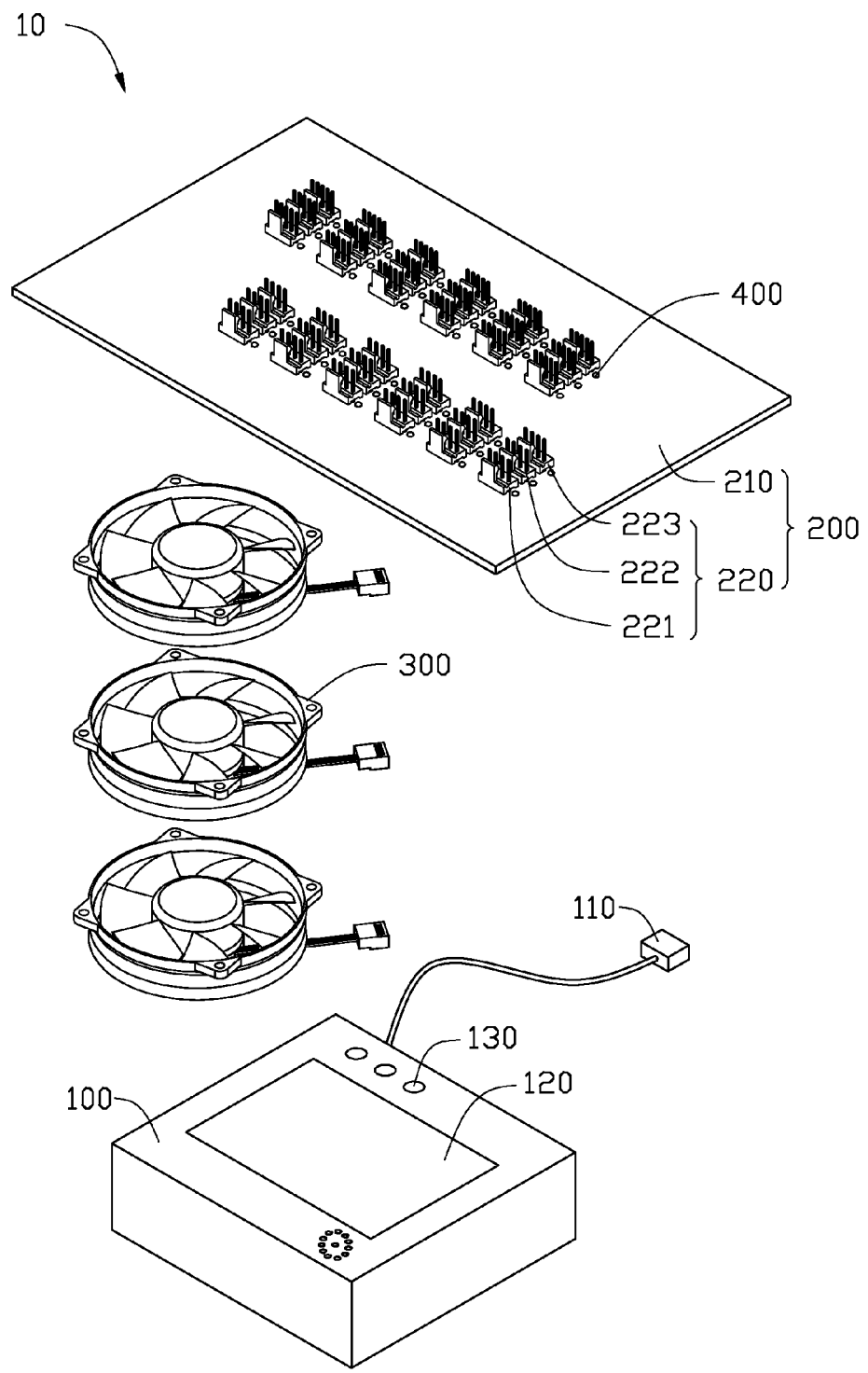

FAN SYSTEM WITH SWITCHING MODULE CONNECTING PWM DEVICE AND FAN

BACKGROUND

1. Technical Field

The disclosure generally relates to a fan system, and particularly to a fan system with a switching module.

2. Description of Related Art

Conventionally, controlling the speed of a fan by Pulse Width Modulation (PWM) reduces power consumption and noise emanating from the fan. To connect the fan to a PWM device the cable of the fan must be opened to expose the wire core so as to connect the PWM device to the fan. However, when many fans in a computer system must be connected to a PWM device, the power cables to the fans must be cut and spliced one by one, and this process is time consuming and laborious, resulting in low testing efficiency.

Therefore, there is room for improvement in the art.

BRIEF DESCRIPTION OF THE DRAWINGS

Many aspects of the present embodiment can be better understood with reference to the following drawings. The components in the drawings are not necessarily drawn to scale, the emphasis instead placed upon clearly illustrating the principles of the present embodiments. Moreover, in the drawings, like reference numerals designate corresponding parts throughout the various views.

The FIGURE is an isometric view of a fan system with a PWM system to power and control a fan, in accordance with one embodiment of the disclosure.

DETAILED DESCRIPTION

Referring to the FIGURE, a fan system 10 includes a PWM device 100, a switching module 200 and a number of fans 300 for testing.

The PWM device 100 includes a testing port 110, a display 120 and buttons 130. The display 120 displays the working voltage, working current, and the rotating speed of the fan 300. The buttons 130 are configured for modifying the frequency of the PWM signal to the fans 300.

The switching module 200 includes a PCB 210 and a plurality of groups of signal connectors 220 arranged on the PCB 210. Each of the signal connectors 220 has a first port 221, a second port 222, and a third port 223. The first port 221, second port 222, and the third port 223 are interconnected with each other. The first port 221 is connected to the testing port 110 of the PWM device 100. The second port 222 is connected to the fan 300. The third port 223 is connected to an interface of a server motherboard for feedback from the server motherboard. In the present embodiment, the first, second, and third ports 221, 222 and 222 each includes four pins. It can be understood that the first, second, and third ports 221, 222 and 223 can be each include four or more than four pins.

In an alternative embodiment, the switching module 200 may include a number of indicator lights 400 adjacent to the first, second, and third ports 221, 222 and 222 to indicate working status.

When modifying the frequency or duty cycle of a PWM signal to the fans 300, the fans 300 are connected to the second port 222 of the signal connectors 220, and an interface of the server motherboard is connected to the third port 223 of the signal connector 220, and the testing port 110 of the PWM device 100 is connected to the first port 221. The fan system 10 can modify the frequency or duty cycle of a PWM signal to the fans 300 at the same time via the switching module 200; moreover, the power cables of the fans does not need to be cut.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A switching module for connecting a Pulse Width Modulation (PWM) device and a plurality of fans for testing, the switching module comprising:
   a print circuit board (PCB); and
   a plurality of groups of signal connectors arranged on the PCB, each of the signal connectors comprising a first port, a second port, and a third port interconnected with each other, the first port being for connecting a testing port of an external PWM device, the second port being for connecting one corresponding fan of the plurality of fans, the third port being for connecting an interface of a server motherboard.

2. The switching module of claim 1, wherein the first, second, and third ports each comprise three or more than three pins.

3. The switching module of claim 1, further comprising indicator lights adjacent to the first, second, and third ports to indicate working status.

4. A fan system comprising:
   a plurality of fans for testing;
   a Pulse Width Modulation (PWM) device; and
   a switching module comprising a print circuit board (PCB), and a plurality of groups of signal connectors arranged on the PCB, each of the signal connectors comprising a first port, a second port, and a third port interconnected with each other, the first port being connected to the PWM device, the second port being connected to one corresponding fan of the plurality of fans, the third port being connected to an interface of a server motherboard.

5. The fan system of claim 4, wherein the PWM device comprise a testing port, a display and at least a button, the testing port being electrically connected to the first port of the signal connector, the display displaying the working voltage of the fan, the button being configured for modifying a frequency of PWM signal of the fan.

6. The switching module of claim 4, wherein the first, second, and third ports each comprise three or more than three pins.

7. The switching module of claim 4, further comprising indicator lights adjacent to the first, second, and third ports to indicate working status.

* * * * *